May 14, 1968   O. L. APFELBECK ET AL   3,383,522
UNDERVOLTAGE SENSING CIRCUIT
Filed Aug. 30, 1965

WITNESSES:

INVENTOR.
Otto L. Apfelbeck and
Norman G. Eversole.
BY
ATTORNEY

United States Patent Office 3,383,522
Patented May 14, 1968

3,383,522
UNDERVOLTAGE SENSING CIRCUIT
Otto L. Apfelbeck, Fort Shawnee, and Norman G. Eversole, Columbus Grove, Ohio, assignors to Westinghouse Electric Corporation, Pittsburgh, Pa., a corporation of Pennsylvania
Filed Aug. 30, 1965, Ser. No. 483,635
9 Claims. (Cl. 307—235)

The present invention relates to undervoltage sensing circuits, and more particularly to such circuits in which the difference between the three phase drop-out voltage and the single phase drop-out voltage is zero or negative or within a tolerable positive range.

Undervoltage sensing circuits are often used in electrical systems so as to provide operating protection for system components. For example, as indicated in U.S. Patent No. 3,001,100 issued to N. F. Schuh and L. R. Lowry, Jr., on Sept. 19, 1961, and assigned to the present assignee, undervoltage sensing circuits have special utility in electrical power systems for aerospace vehicles, and in such applications it is especially desirable because of environment parameters that the sensing circuitry be formed from static components.

In the Schuh and Lowry patent, a resistance voltage divider is connected from each phase to ground, and a diode AND circuit is connected from the voltage dividers to an output semiconductor switch. If one of the phase voltages drops individually to a predetermined level, an associated diode path in the AND circuit conducts to ground and an output signal is produced for operating a suitable control circuit. If all three phase voltages drop simultaneously, the same result occurs but the three phase voltage drop need not be as great as the single phase voltage drop in order to produce the signal output. The three phase single phase drop-out differential results from the fact that a higher potential on the line side of the AND diodes is sufficient to produce ground current flow simultaneously through the three AND diode paths. The resultant three phase-single phase drop-out differential can be as high as three volts or more and in any event is often greater than system specifications allow.

The present invention is directed to correcting the drop-out differential problem and, in addition, to certain other sensing circuit improvements. In accordance with the broad principles of the invention, a polyphase undervoltage sensing circuit comprises voltage dropping means connected to each phase line and producing a unidirectional voltage which varies as a function of the associated phase line voltage. If there are three phase lines, the voltage dropping means are interconnected in a delta or Y network so as to provide reduced three phase-single phase drop-out differential. A diode associated with each phase is connected from a DC source to ground and the voltage dropping means are interconnected with the diode paths so that the diodes are non-conducting when the phase line voltages are properly valued.

A trigger circuit is operated to one state by the DC source when the diodes are non-conducting and to another state when the diodes are conducting. An output of the trigger circuit can be employed in logic control circuitry or it can be used to actuate with time delay a control device. A single potentiometer in the trigger circuit provides variation in the phase drop-out voltage level and the trigger circuit is otherwise arranged to produce stable steady state circuit operation.

It is therefore an object of the invention to provide a novel polyphase undervoltage sensing circuit which operates efficiently and accurately to produce a digital or analog output undervoltage control signal.

It is another object of the invention to provide a novel three phase undervoltage sensing circuit in which three phase-single phase drop-out differential is reduced or eliminated.

An additional object of the invention is to provide a novel polyphase undervoltage sensing circuit which is economically manufactured and operated.

A further object of the invention is to provide a novel polyphase undervoltage sensing circuit which is economically arranged to operate with temperature stability.

It is another object of the invention to provide a novel polyphase undervoltage sensing circuit which operates efficiently with steady state stability without responding to DC ripple or DC transient voltages.

These and other objects of the invention will become more apparent upon consideration of the following detailed description along with the attached drawing, in which.

Figure 1:
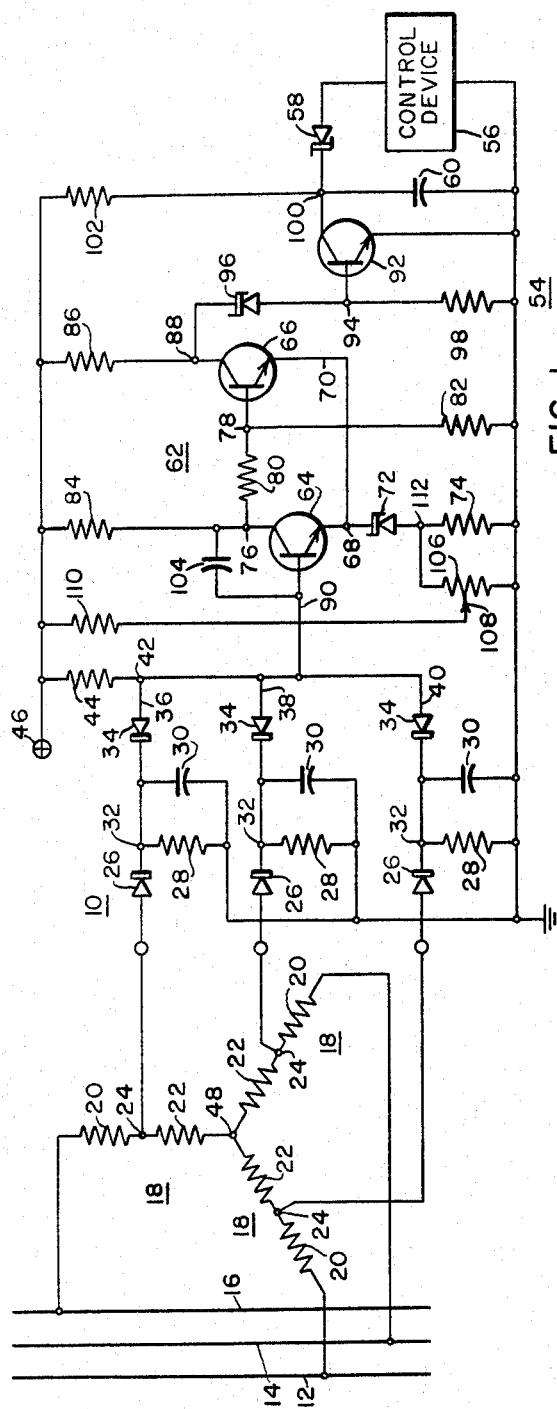
FIGURE 1 shows a schematic view of a three phase undervoltage sensing circuit arranged in accordance with the principles of the invention.

More specifically, there is shown in FIG. 1 a sensing circuit 10 arranged to indicate undervoltage conditions in polyphase or three-phase lines 12, 14 and 16. Each phase line is connected to voltage dropping means or a voltage divider 18 comprising series connected resistors 20 and 22 divided by a junction 24. A semiconductor diode 26 and a resistor 28 are connected from each voltage divider junction 24 to ground, and a capacitor 30 is preferably connected across each resistor 28 so as to reduce the ripple existing in the DC potential at junctions 32 between the resistors 28 and the diodes 26. The DC potential at the junctions 32 varies as a function of the phase line voltages as considered more fully hereinafter.

The resistors 28 are connected in series respectively with diodes 34 to form AND paths 36, 38 and 40 connected through a junction 42 and a resistor 44 to a suitable DC source 46. The diodes 34 are normally reverse biased by the DC potential at the junctions 32. Accordingly, source current flows through the diodes 34 and the resistors 28 to ground only if the DC potential of one or more of the junctions 32 drops below the DC potential of the junction 42. Normally, about one half volt forward drop across any of the diodes 34 results in current conduction in the associated path 36, 38 or 40.

The voltage dividers 18 are Y connected through a common nongrounded or "floating" junction 48 for the purpose of setting the three phase-single phase drop-out differential at an acceptable value. Thus, the currents through the resistors 22 are a function of all three of the phase line voltages.

Generally, if all three phase line voltages drop, the currents through the voltage divider resistors 20 and 22 drop a certain amount to produce a certain reduced potential at the junctions 24. If only one of the phase line voltages drops by the same amount that the three phase line voltages dropped, the associated voltage divider current drop is relatively greater to produce a relatively lower potential at the associated junction 24.

By suitable choice of the resistance value of the resistors 20 and 22, the potential at the junctions 24 can be functionally related to the phase line voltages such that any or all of the AND diodes 34 become conductive at a predetermined line voltage drop in a single associated phase line or at the same line voltage drop in all three phase lines. In such case, "drop-out," or current conduction occurs in the diode 34 or diodes 34 for identical three phase and single phase line voltage drops and the three phase-single phase drop-out differential is zero. By other choices of resistance values, the three phase drop-out voltage value can be made higher or slightly lower than the single phase drop-out voltage in which case the three phase-single phase drop-out differentials are respectively negative and slightly positive. Preferably, the resistors 20 and 22 are set in value, or adjusted in value if potentiometers are used, to make the three phase-single phase drop-out differential zero or negative.

Figure 2:
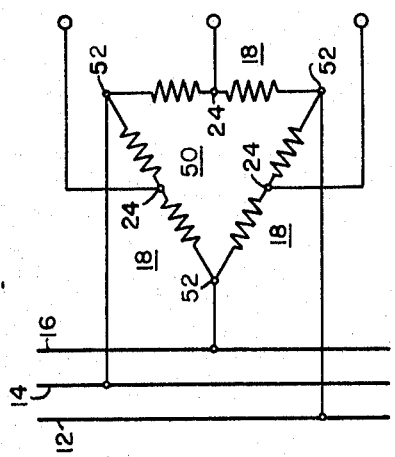
FIGURE 2 shows an alternate arrangement for a portion of the circuit shown in FIGURE 1.

As shown in FIG. 2, the voltage dividers 18 can also be connected in a delta circuit configuration 50 with junctions 52 connected respectively to the phase lines 12, 14 and 16. The delta circuit 50 thus is "non grounded," i.e., all of the phase junctions are at line potentials, and it provides circuit operation similar to that described for the Y connected circuit in FIG. 1.

The AND circuit junction 42 is also connected to the input of an output switching circuit 54 which operates a suitable control device 56 when any or all of the AND paths 36, 38 and 40 are conductive. The control device 56 is thus activated when one or more of the phase line voltages drops below the voltage sensing level of the circuit 10. A Zener diode 58 and a capacitor 60 provide time delay in the energization of the control device 56 so as to prevent control actuation during short term transient variations in the line voltage.

The switching circuit 54 preferably includes a monostable trigger circuit 62 which is similar to a Schmitt trigger circuit. It includes semiconductor switches or transistors 64 and 66 having emitters 68 and 70 commonly connected to ground through a Zener diode 72 and an emitter resistor 74. A collector 76 of the transistor 64 is coupled to a base 78 of the transistor 66 through a resistor 80. The transistor base 78 is connected to ground through a base resistor 82 and collector resistors 84 and 86 connect transistor collectors 76 and 88 to the DC source 46.

Under normal operating conditions, current is blocked from the AND paths 36, 38 and 40. The AND junction 42 is coupled to a base 90 of the trigger transistor 64 and is at a predetermined voltage level which produces drive current through the trigger transistor base-emitter path and the Zener diode 72 to ground. The trigger transistor 64 is thus normally conductive and the trigger transistor 66 is normally nonconductive to place the collector terminal 88 at a high potential. A filter capacitor 104 is connected between the collector 76 and the base 90 of the trigger transistor 64 so as effectively to prevent DC ripple (for example, some 400 cycle or other frequency ripple may remain after filtering by the capacitors 30) or other transient DC voltages from operating the trigger circuit 62.

A grounded emitter output transistor 92 has its base 94 connected to the trigger collector terminal 88 through a Zener diode 96 and to ground through a resistor 98. Its collector 100 is connected to the DC voltage source 46 through a collector resistor 102. The transistor 92 is conductive when the trigger transistor 66 is nonconductive, i.e., when the voltage at the trigger collector terminal 88 is sufficiently high to break down the Zener diode 96 and produce forward bias across the base-emitter PN junction of the transistor 92. Since the trigger transistor 66 is normally nonconductive, the transistor 92 is normally conductive to place the transistor collector terminal 100 approximately at ground potential so that insufficient voltage is available for operation of the control device 56 through the output Zener diode 58.

When the line voltage or voltages drop to produce a sufficiently low potential at one or more of the AND junctions 32, the diode or diodes 34 become adequately forward biased to divert current from the base-emitter circuit of the trigger transistor 64 through one or more of the AND paths 36, 38 and 40. The trigger transistor 64 then becomes nonconductive and the trigger transistor 66 becomes conductive by regenerative feedback action (including that produced by the coupling resistor 80 and the common emitter resistor 74). The trigger transistor collector 88 is thus driven to a low potential which is insufficient to operate the transistor 92 through the Zener diode 96. Since the trigger collector is at either a high or a low potential, it can be used as a convenient digital output connection (not shown) to indicate the state of the line voltage or voltages. If the trigger circuit 62 is omitted in the undervoltage sensing circuit 10, an analog output can be provided through a transistor in a manner similar to that disclosed in the aforementioned patent.

A drop-out control potentiometer resistor 106 is connected across the trigger circuit emitter resistor 74, and an arm 108 of the potentiometer is connected through a voltage dropping resistor 110 to the DC voltage source 46. The potentiometer connecting arrangement provides "fine control" of the potential at the junction 42 and in turn the potential required at the junctions 32 for the diode or diodes 34 to become forward biased and for the input trigger transistor 64 to be switched to a nonconductive state. The net common emitter resistance nonetheless always produces sufficient feedback action for proper trigger circuit operation.

When the potentiometer arm 108 is moved to insert increased potentiometer resistance in the series path between the resistor 110 and ground, the potentials at junction 112 and the AND junction 42 are raised in the base emitter circuit of the transistor 64. The opposite effect is achieved when the potentiometer arm 108 is moved in the opposite direction. The line voltage at which the circuit 10 drops out depends in part on the potential level of the AND junction 42 as previously noted, and the drop-out point is thus conveniently and economically adjusted by a single potentiometer. Even if the potentiometer fails during circuit operation, only a slight shift in the voltage drop-out point occurs and the circuit 10 continues to operate properly.

Since the Zener diode 72 is connected in the emitter base circuit of the input trigger transistor 64, the relatively high emitter collector current through the trigger transistor 64 or 66 always flows through the Zener diode 72. There is thus eliminated any requirement that the Zener diode 72 have a critical knee characteristic and the Zener diode 72 can accordingly be a less expensive production line component. Preferably, the Zener temperature coefficient is substantially matched with the base-emitter coefficient of the trigger transistor 64 so as to produce temperature stable circuit operation. Temperature compensating resistors are thus not required.

In summary, the circuit 10 provides improved undervoltage sensing through the provision of limited or zero three phase-single phase drop-out differential. Further, stable steady state and stable temperature operation and adjustment of the voltage drop-out level are efficiently and economically provided.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. An undervoltage sensing circuit for a three phase line comprising three resistance voltage dividers Y connected to the three phase lines with a floating common terminal, an AND circuit having three diodes connected in respective paths between a DC source and a ground terminal, means connecting an intermediate junction of each of said voltage dividers to the respective diode paths in said AND circuit so as normally to bias said diodes to a non-conductive state with reverse DC voltage, and means for generating an output signal when any of said diodes becomes conductive.

2. An undervoltage sensing circuit for a three phase line comprising three resistance voltage dividers delta connected to the three phase lines, an AND circuit having three diodes connected in respective paths between a DC source and a ground terminal, means connecting an intermediate junction of each of said voltage dividers to the respective diode paths in said AND circuit so as normally to bias said diodes to a nonconductive state with reverse DC voltage, and means for generating an output signal when any of said diodes becomes conductive.

3. An undervoltage sensing circuit for a poly-phase line comprising an AND circuit having a plurality of diodes connected in respective paths which are connected between a DC source and a ground terminal and associated respectively with the phase lines, voltage dropping means corresponding in number to that of said phase lines and interconnected with said phase lines, means connecting an intermediate junction of each of said voltage dropping means to the respective diode paths in said AND circuit so as normally to bias said diodes to a nonconductive state with reverse DC voltage, a monostable trigger circuit energized by the DC source and having an output semiconductor switch and an input semiconductor switch, control circuit means coupling an output of said AND circuit to said input switch so that said input switch is normally conductive, variable resistance means connected in said control circuit means to vary the line voltage at which said AND circuit drops out to turn said input switch off and said output switch on, and means for generating an output signal when said output switch becomes conductive.

4. An undervoltage sensing circuit for a poly-phase line comprising an AND circuit having a plurality of diodes connected in respective paths which are connected between a DC source and a ground terminal and associated respectively with the phase lines, voltage dropping means corresponding in number to that of said phase lines and interconnected with said phase lines, means connecting an intermediate junction of each of said voltage dropping means to the respective diode paths in said AND circuit so as normally to bias said diodes to a nonconductive state with reverse DC voltage, a monostable trigger circuit energized by the DC source and having an input transistor and an output transistor, said transistors having commonly connected emitters, a resistor connected in a path between said emitters and the ground terminal, circuit means including said emitter resistor for coupling an output of said AND circuit to the base-emitter path of said input transistor so that said input transistor is normally conductive, a potentiometer resistor shunted across said emitter resistor, means connecting an arm of the potentiometer to the DC source so as to provide for varying the line voltage level at which said AND circuit drops out to turn said input transistor off and said output transistor on, and means for generating an output signal when said output transistor is turned on.

5. An undervoltage sensing circuit as set forth in claim 4 wherein a Zener diode is connected between said emitters and said emitter resistor.

6. An undervoltage sensing circuit as set forth in claim 4 wherein a filter capacitor is connected between the collector and base terminals of said input transistor.

7. An undervoltage sensing circuit comprising three resistance voltage dividers connected in a three phase ungrounded network configuration to a three phase line, an AND circuit having three diodes connected in respective paths between a DC source and a common terminal, means connecting an intermediate junction of each of said voltage dividers to the respective diode paths in said AND circuit so as normally to bias said diodes to a nonconductive state with reverse DC voltage, a monostable trigger circuit energized by the DC source and having an output semiconductor switch and an input semiconductor switch, control circuit means coupling an output of said AND circuit to said input switch so that said input switch is normally conductive, variable resistance means connected in said control circuit means to vary the line voltage level at which said AND circuit drops out to turn said input switch off and said output switch on, and means for generating an output signal when said output switch becomes conductive.

8. An undervoltage sensing circuit comprising three resistance voltage dividers connected in a three phase ungrounded network configuration to a three phase line, an AND circuit having three diodes connected in respective paths between a DC source and a common terminal, means connecting an intermediate junction of each of said voltage dividers to the respective diode paths in said AND circuit so as normally to bias said diodes to a nonconductive state with reverse DC voltage, a monostable trigger circuit energized by the DC source and having an input transistor and an output transistor, said transistors having commonly connected emitters, a resistor connected in a path between said emitters and the ground terminal, circuit means including said emitter resistor for coupling an output of said AND circuit to the base-emitter path of said input transistor so that said input transistor is normally conductive, a potentiometer resistor shunted across said emitter resistor, means connecting an arm of the potentiometer to the DC source so as to provide for varying the line voltage level at which said AND circuit drops out to turn said input transistor off and said output transistor on, and means for generating an output signal when said output transistor is turned on.

9. An undervoltage sensing circuit as set forth in claim 8 wherein a Zener diode is connected between said emitters and said emitter resistor, and a filter capacitor is connected between the collector and base terminals of said input transistor.

No references cited.

ARTHUR GAUSS, *Primary Examiner.*

J. BUSCH, *Assistant Examiner.*